Dec. 13, 1927.
J. W. LEGG
1,652,535
VACUUM GAUGE
Filed Oct. 9, 1920
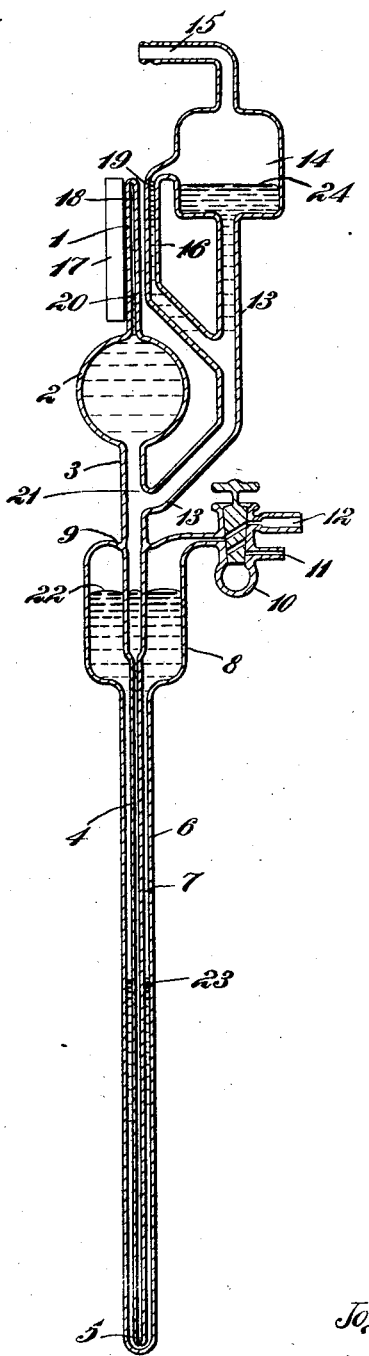
WITNESSES:
INVENTOR
Joseph W. Legg.
BY
Chesley G. Carr
ATTORNEY Patented Dec. 13, 1927.

1,652,535

UNITED STATES PATENT OFFICE.

JOSEPH W. LEGG, OF WILKINSBURG, PENNSYLVANIA, ASSIGNOR TO WESTINGHOUSE ELECTRIC & MANUFACTURING COMPANY, A CORPORATION OF PENNSYLVANIA.

VACUUM GAUGE.

Application filed October 9, 1920. Serial No. 415,938.

This invention relates to means for measuring low pressures, commonly called vacuum gauges, more especially to one which utilizes the compression of a gas to measure the original pressure thereof.

Several types of vacuum gauges have been proposed heretofore, one of which has been in fairly common use. This gauge consisted essentially of a capillary tube communicating with the top of a bulb, the lower end of which was connected to another bulb containing mercury, by means of a flexible tube. There was also a connection to the capillary tube and its bulb from a source of vacuum to be measured.

When it was desired to determine a vacuum, the bulb containing mercury was lowered so that communication was established between the vacuum to be measured and the capillary tube and its bulb, after which the mercury bulb was raised to confine the gas in the capillary tube, and readings were taken after the level of mercury in the capillary tube had arisen to a predetermined fixed point.

It will be seen that, in measuring various pressures with such an instrument, the pressure of the gas within the capillary tube would vary by reason of the mercury being caused to rise to the same point whatever might be the pressure to be measured. This gave rise to a variable error in measurement since the basis of the determination is a perfect gas, whereas practically all gases measured would be imperfect gases and would not follow Boyle's law. Such a gauge setting must be adjusted very carefully at each determination, and the height of the mercury reservoir be changed to allow for changes in atmospheric pressure. It often occurred that, in measuring high vacuums with such a gauge, the sudden rush of mercury from one part of the gauge to another caused so-called "hammering", which frequently broke the apparatus, even in the hands of a skilled operator.

The present invention is designed to eliminate the difficulties encountered in prior vacuum gauges, it being among the objects thereof to construct a gauge which shall practically obviate danger of breakage due to improper manipulation or accidental or sudden changes of pressure, which shall be easy to manipulate and be practically automatic in its action.

In practicing my invention, I provide a capillary tube, as formerly, arranged so that the tube may be placed in communication with a source of vacuum to be measured, but, by providing additional features, I have been enabled to obviate inaccuracies introduced by changes in atmospheric pressure in readings on the scale of the gauge. Specifically, I have so proportioned my apparatus that, when the gauge is in operative position, the area of mercury in contact with the low pressure or vacuum to be measured is many times greater than the area subject to the pressure of the atmosphere. By making the ratio large, say 500 to 1, even extreme variations in atmospheric pressure, as great as one inch of mercury, will cause a change in level of the mercury exposed to the vacuum of 1/500 of an inch at the most. Since this error is no greater than the error in reading the scale, it may, for practical purposes, be considered absent.

I have provided also means to prevent a sudden rush of mercury from one point in the apparatus to another and have accomplished this by forming a constricted portion in one of the tubes through which the mercury must flow, thereby forcing it to move slowly and avoiding the often encountered difficulty of "hammering" and consequent breaking of the apparatus.

In order to increase the senstitiveness of my instrument, I have so arranged the parts that a very large volume of gas obtained from the source of vacuum to be measured is compressed to a very small volume in the capillary tube. To accomplish this, I form a bulb on the lower end of the capillary tube, the volume of the bulb and connections being 100 times or 1000 times or any desired number of times greater than the volume of a predetermined portion of the capillary tube which is to constitute the gauge proper.

In the accompanying drawings forming a part hereof and in which similar reference characters denote similar parts, The single figure is a view, in vertical cross section, through a vacuum gauge constructed in accordance with my invention.

A capillary tube 1, closed at the top, is secured to a bulb 2 of relatively large volume, and a tube 3, secured in the lower end of bulb 2, extends downwardly merging into a smaller tube 4 of considerable length. The lower end of tube 4 is formed with a constricted portion 5. Surrounding tube 4 and concentric therewith, is a tube 6, the latter tube being closely adjacent to the tube 4 so that the area 7 between the inner and the outer tube is very small.

The tube 6 constitutes a downward extension of receptacle 8 secured to tube 3 at point 9. A valve 10 of suitable construction allows communication between receptacle 8 and a source 12 of a partial vacuum and also, at point 11, to the atmosphere, the valve being so constructed that the receptacle 8 may be alternately connected to the partial vacuum or to the air or be cut off from both, at will.

A side tube 13 is secured in tube 3 at a point slightly below bulb 2, the upper end of tube 13 terminating in a chamber 14 having a tube 15 leading from the top thereof and adapted to be connected to a vacuum to be measured. A capillary tube 16 has its upper end opening into chamber 14 at a point above the highest mercury level therein and its lower end opening into tube 13. A scale 17, suitably calibrated, is secured to the capillary tube 1, the upper closed end 18 of which is at the same level as the mercury 19 in tube 16 when the apparatus is in position for the determination of a vacuum. The relative volumes of capillary tube 1 and bulb 2, with its connections, are such that the volume from point 18 to zero point 20 is a predetermined fraction, say 1/100 of the volume from point 18 to point 21 where tube 13 is connected into the system.

In order to place the apparatus in condition for measuring vacuums initially, receptacle 8 is filled with mercury to a point somewhat below level 22, and tube 15 is connected to a vacuum. Stop valve 10 is opened to allow communication of receptacle 8 with the atmosphere, thus forcing the mercury in the receptacle down through space 7 and up into tube 4, bulb 2 and chamber 14. Mercury is then added to receptacle 8 until the level 19 in capillary tube 16 is at the same height as the top 18 of capillary tube 1. If a predetermined and known vacuum had previously been established in chamber 14 and, therefore, capillary tube 1 and bulb 2, and the level 20 of mercury reached, this point may be set as the zero or starting point, and the pressure measured at this point be determined by simple calculations. The scale 17 between points 18 and 20 may then be calibrated by interpolating figures.

After the gauge has been calibrated, valve 10 is opened so that receptacle 8 communicates with partial vacuum 12 in order to draw the mercury back into receptacle 8 to the normal level 22. In order to measure a vacuum, tube 15 is connected to the vacuum to be measured, valve 10 opened to allow access of air into receptacle 8, forcing mercury into bulb 2 and chamber 14 until the level of mercury rises automatically to point 19, the other mercury level in contact with the atmosphere being at point 23. The lengths of tubes 4 and 6 are such that there is at least 760 mm. between level 22 of mercury and constricted portion 5. This obviates any danger of the mercury level in tube 4, when vacuum is applied to receptacle 8 and atmospheric pressure is in tube 15, from falling to a point below the open end of tube 4 and thus suddenly introducing air into receptacle 8 through tube 6 and thus breaking the apparatus by mercury hammer. The pressure in the vacuum chamber may be read directly from scale 17. In order to place the apparatus in position for measuring another vacuum, it is merely necessary to open valve 10 to the partial vacuum 12 and allow the mercury level to drop beyond point 21.

By means of this apparatus, it is a very simple matter to measure vacuums since all that is necessary is to connect tube 15 to the source of vacuum and open valve 10. The readings are very accurate and are unaffected by changes in atmospheric pressure, since the area 23 of mercury is very small compared to the area 24. There is no danger of breakage since it is impossible for mercury to flow swiftly by reason of the constriction 5 in the lower end of tube 4.

Although I have shown and described a specific embodiment of my invention, it is obvious that my invention is not limited to the exact structure shown, as various changes may be made in details of the apparatus without departing from the principles involved. For instance, instead of forming the constricted portion at the lower end of tube 4, such constriction may be placed at some other point in the apparatus, the form of the various chambers, bulbs, and receptacles may be changed at will, as may also the positions of the various parts.

I claim as my invention:

A vacuum gauge comprising a capillary tube, the upper end thereof being closed and the lower end communicating with a bulb, another tube secured in the lower end of said bulb and extending downwardly for a distance sufficient to prevent air from entering the same, an elongated receptacle surrounding said latter tube throughout the length thereof, said receptacle and tube having a restricted communication at their lower ends, a branched tube in unrestricted communication with the upper portion of said latter tube and with a chamber communicating with a vacuum to be measured, and means in said receptacle cooperating with said tube for preventing a rapid flow of liquid in said capillary tube.

In testimony whereof, I have hereunto subscribed my name this 6th day of October, 1920.

JOSEPH W. LEGG.